Oct. 25, 1955 — C. E. PEDERSEN — 2,721,411
COLLECTING DEVICE FOR LIVE FISH
Filed July 29, 1950 — 2 Sheets-Sheet 1

INVENTOR.
Carl Emil Pedersen
BY
Attorney

Oct. 25, 1955     C. E. PEDERSEN     2,721,411
COLLECTING DEVICE FOR LIVE FISH
Filed July 29, 1950     2 Sheets-Sheet 2

INVENTOR.
Carl Emil Pedersen
BY
ATTORNEY

United States Patent Office 2,721,411
Patented Oct. 25, 1955

2,721,411

COLLECTING DEVICE FOR LIVE FISH

Carl Emil Pedersen, Marseille, France

Application July 29, 1950, Serial No. 176,598

13 Claims. (Cl. 43—9)

This invention relates to fishing devices and more particularly to a collecting device for live fish adapted to be detachably connected to the after end of a fishing net so as to replace the bag or cod end thereof.

The primary object of the collecting device according to the invention is to provide means whereby the fish caught in the trawl or other net is introduced into what may be termed as a submarine aquarium, i. e. an enclosed container communicating with the rear end of the trawl, and wherein a mass of water is maintained substantially at rest, while the trawl and container are being towed through the water.

Another object of the invention is to provide a trap device within said container comprising screening means whereby the fish is sluiced into the container, said trap device being preferably provided with means whereby the water sluiced through the trap together with the fish is evacuated from the fore end of the container without creating any appreciable current in the mass of water within the rest of the cavity of the container.

Other and ancillary objects of the invention will appear from the following specification with reference to the drawings therein Fig. 1 is a perspective view illustrating the fish collecting device attached to the after end of a trawl net, Fig. 2 is a sectional side view of the collecting device, taken along line 2—2 of Fig. 1 with certain line members omitted, Figs. 3 and 4 are sectional side views, similar to Fig. 2, of the front portion of the collecting device illustrating the trap device inside the container in two different positions, viz. the positions in which the front opening of the container is closed and open, respectively.

When using the trawl or other nets previously known, the net, the tail or cod end of which may be provided with a lining of pervious material, is hoisted onboard the fishing vessel after each catch while the water is running away through the meshes of the net. The fish thus heaved up and exposed to the air generally die, and the well-organized fishermen nowadays therefore generally carry a quantity of ice or the vessels may be equipped with a refrigerating plant to preserve the dead fish until it is brought ashore.

The fundamental idea underlying the present invention is to provide a collecting device which remains immersed in the water—like a well-box—so that the fish is retained alive in a mass of water which remains substantially at rest within the cavity of the container constituting the collecting device irrespective of the speed with which the trawl and the collecting device is being towed through the water. When the collecting device is towed into port the fish may remain therein until it is sold, or alternatively it may be transferred to other containers adapted to transport the fish to the retail shops where the live fish may be unloaded into the well known tubs or water basins until it is finally sold to the customer.

Figure 1:
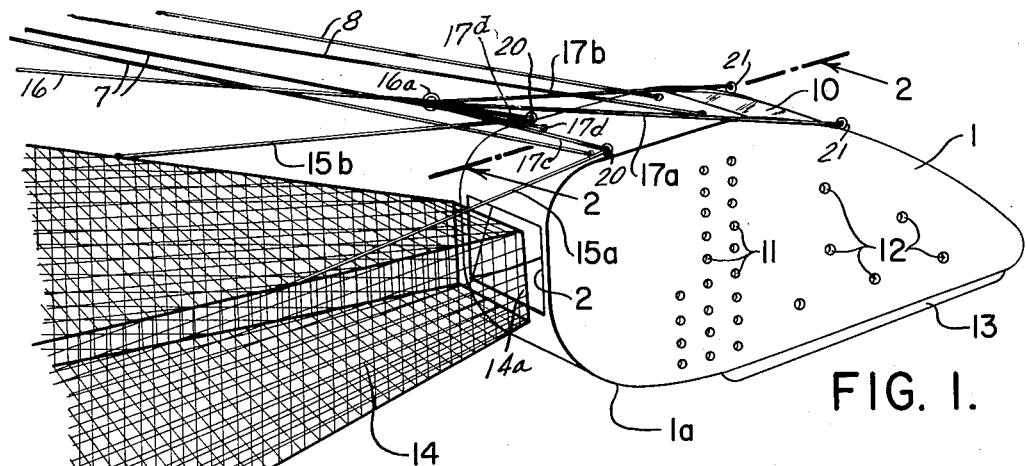

In the embodiment illustrated in the drawings the collecting device or submarine aquarium comprises a substantially streamlined container 1 of any suitable material such as metal or a plastic material, the front portion of which may be slightly curved as shown at 1a. The container 1 is provided with a front opening 2 which coincides with the opening 14a in the after end of a trawl or similar net 14 as illustrated in Fig. 1 where the two openings are shown slightly separated in order to illustrate the details more clearly.

Figure 8:
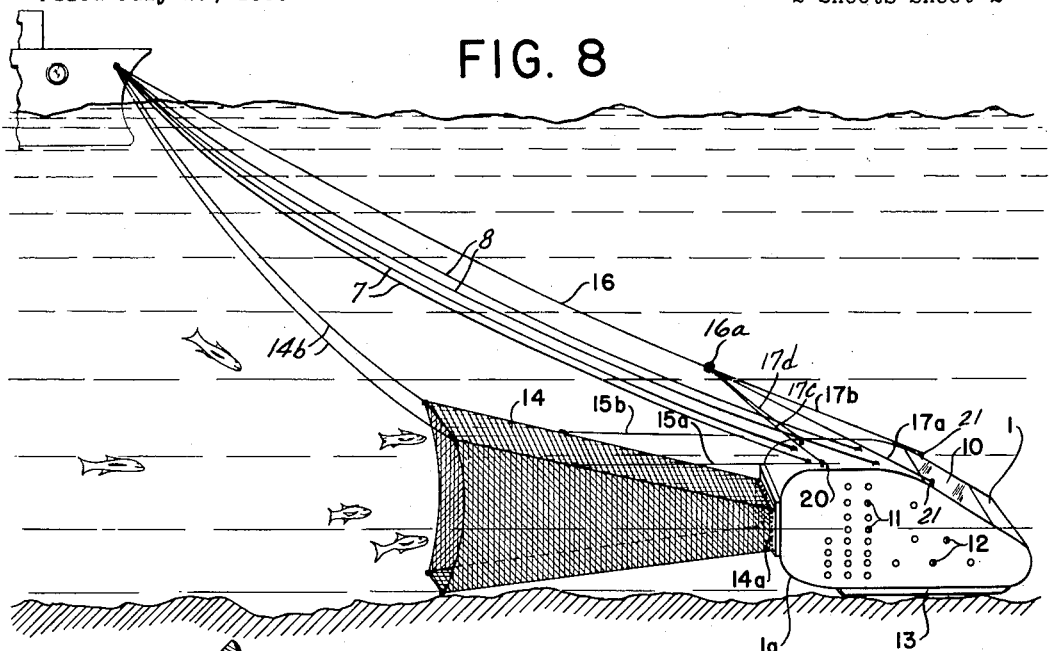
Fig. 8 shows the fishing boat, the trawler net, and the aquarium or fish collecting device in their relative positions during the catch.
Figure 5:
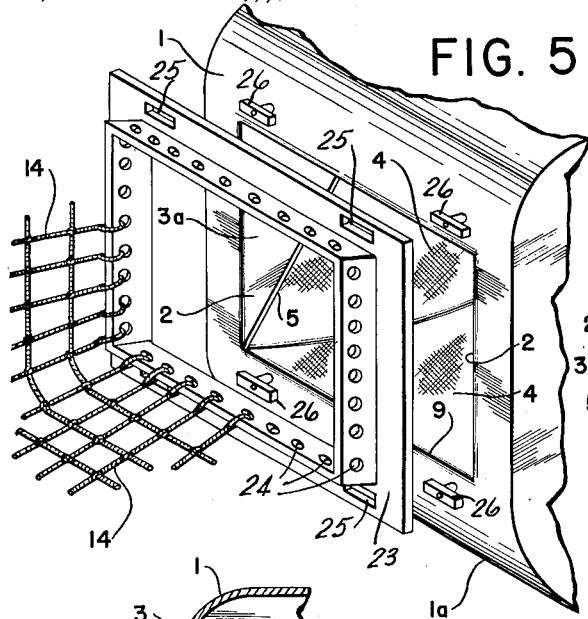
Fig. 5 is a perspective view showing how the open end of the trawl net is attached to the open end of the fish collecting device.
Figure 6:
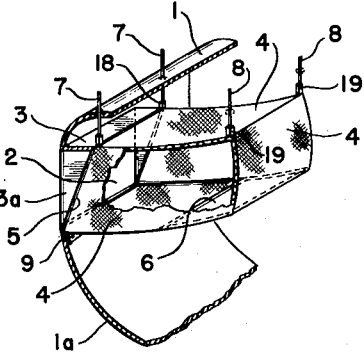
Fig. 6 shows how, by manipulating certain ropes, the various positions of the trap device are obtained.
Figure 7:
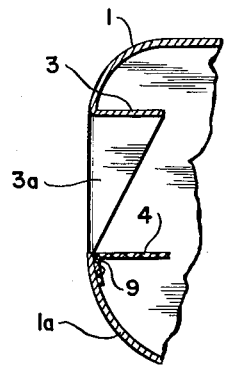
Fig. 7 shows the manner in which the open end of the trap device is attached to the open end of the container of the fish collecting device.

The after end of the trawl 14 may be attached to the fore end of the container 1 around the opening 2 in any convenient manner (not illustrated) so long as the trawl 14 and container 1 are maintained in proper alignment when the net is drawn through the water and moreover the container is attached to the trawl by means of lines or ropes 15a and 15b attached to eyelets 20 on the upper part of the container 1. Furthermore, the container 1 may be attached to the vessel by means of a draw line 16 and stays 17a and 17b attached to eyelets 21 on the upper surface of the container behind the ropes 15a and 15b and stays 17c and 17d attached to the eyelets 20. It will be noted that line 16 is attached to ring 16a which in turn is attached to stays 17a, 17b, 17c and 17d as shown in Fig. 8.

In the rear portion of the upper surface of the container 1 a window 10 is provided, the transparent material of which is preferably made of a plastic material such as "Plexiglas" but may also consist of ordinary glass.

Figure 2:
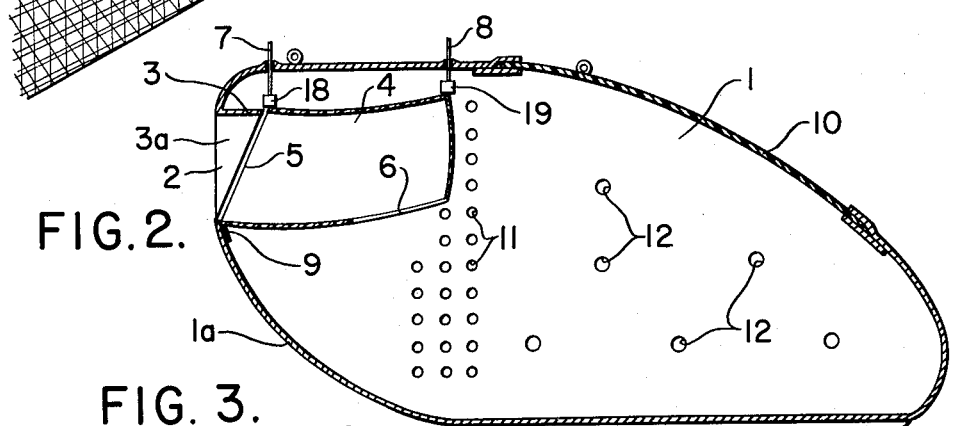
Figures 3, 4:
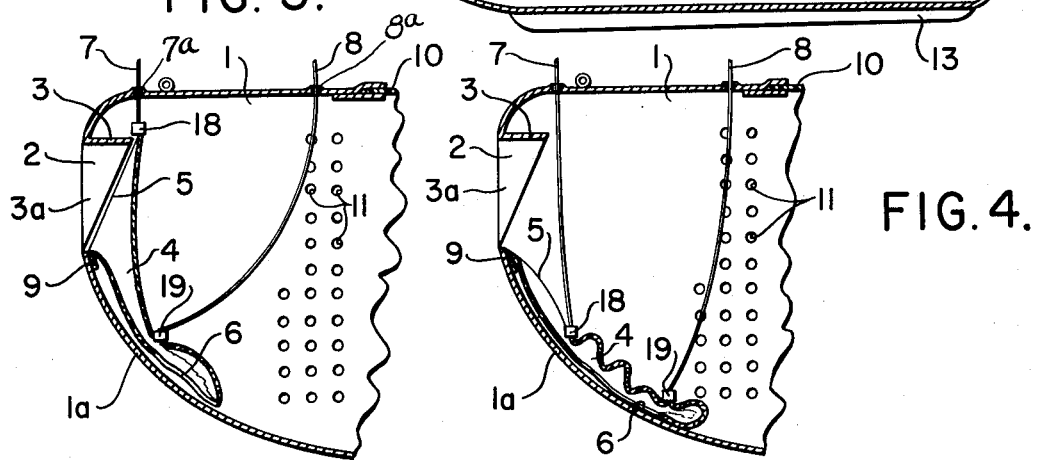

Within the cavity of the container 1, as illustrated in Figs. 2, 3, and 4, there is provided a trap device comprising a bag shaped member 4 preferably made of heavy canvas, sail cloth or the like which is substantially impervious. This hollow body 4 is provided with a front opening 5 which substantially coincides with the front opening 2 of the container 1. The underside of the opening 5 of the hollow body 4 is fastened to the underside of the front opening 2 at point 9. The other four sides are left free to move as explained below. In order to facilitate the fastening of the bag 4 in a convenient position relatively to the front end of the container 1 around the opening 2 it may be convenient to provide a support for the outer end of the hollow body or bag 4 comprising a substantially horizontally disposed plate member or the like 3 just above the opening 2 and substantially vertically disposed triangular side members 3a. The rear portion of the bottom of bag 4 is provided with an inlet opening 6 having substantially the same area as the front opening 5. The said inlet opening 6 communicates with the interior of the container 1. The bag 4 is suspended within the cavity of container 1 by means of two pairs of ropes 7,7, and 8, 8, respectively attached to the front and rear end of bag 4 respectively and extending upwardly through the wall of container 1 in such a manner that by attaching the ropes to the exterior of container 1 or by taughtening the ropes in any other convenient manner the bag may be held in the operative position illustrated in Fig. 2 whereas by slackening one or both of the ropes 7 and 8 the bag 4 may be lowered into the positions illustrated in Figs. 3 and 4 respectively. In order to facilitate the latter operation each of the ropes may be provided with loads 18 and 19 respectively. The ropes should be long enough so that they extend upwardly to the towing vessel, permitting operation of the device.

The securing of members 7 and 8 to selectively position the elements of member 4 is accomplished as follows: the open end 5 of member 4, i. e. its lower side or edge, is fixed to the lower side of opening 2 of the casing 1 and can pivot about such point of securement. The two ropes 7 are fixed to the upper side of such open end 5 of the member 4, and these two ropes pass through two corresponding holes 7a in the upper wall of the casing and when the two ropes are knotted together on the top of the casing, the open end portion 5 of member 4 will assume one position and upon loosening such ropes, such open end portion will drop by its own weight to assume the plurality of different positions, until it has reached the bottom of the casing as shown in Fig. 4, thereby leaving the aperture 2 entirely free and open. The two pairs of ropes 7 and 8 pass through corresponding holes 7a, 7a and 8a, 8a respectively in the upper wall of the casing and when these two ropes 7 and the two ropes 8 are knotted together, the member 4 is quite close to the upper wall of the casing as shown in Fig. 2 of the drawing. When the two ropes 8 are loosened the rear end of member 4 through its own weight, will fall down to the bottom of the casing as shown in Fig. 3, and will thereby cover the openings 2 and 5. This operation is effected when the casing or aquarium contains sufficient fish and is towed towards port or towards another stationary or floating container to preclude the possibility of any fish finding their way out of the container during the towing operation. Once in port, or alongside a stationary or floating container, the opening 2 of the casing or aquarium is fixed to an opening of the same dimensions of such container. Then the ropes 7 are loosened and the fore-end of the member 4 will fall to the bottom of the casing, thereby leaving the aperture 2 of the aquarium entirely open so as to make it possible to empty the water and the fish from the casing to the stationary or floating container. When the aquarium is to be used again for catching another load of fish, the ropes 7, 7 and 8, 8 are knotted, i. e. tightened, and the member 4 may resume its position as shown in Fig. 2 of the drawing.

The side walls of container 1 are provided with a series of holes 11 adapted to permit the water flowing into container 1 through the openings 2, 5 and 6 to escape from the interior of container 1 through the holes 11 without causing any heavy currents in the rear portion of the container where the live fish are retained until the collecting device is brought into port. The total surface area of the holes 11 should preferably be substantially equal to the area of each of the openings 2 and 6, respectively, in order to facilitate the sluicing operation by causing substantially the whole mass of water introduced through said openings to be evacuated through the holes 11 instead of being pressed into the rear end of the container. Furthermore, the rear portion of the side walls of the container may be provided with relatively few scattered holes 12 adapted to provide a slow but regular renewal of the water in the rear portion of container 1. The holes 12 define an area which is relatively small when compared to the area defined by the holes 11.

In order to protect the bottom of the container 1 when the collecting device is dragged over the sea bottom, the under surface of the container may be provided with suitable reinforcements such as rails or ribs 13 as illustrated in Figs. 1 and 2.

The operation of the fish collecting device as described and illustrated is briefly as follows.

The submarine aquarium 1 is attached to the after end of a net 14 as illustrated in Fig. 1, the opening 2 coinciding with the after end opening the the net. The suspension ropes 7 and 8 are taughtened and attached in a suitable manner to the bag 4 so as to hold the bag 4 in the position shown in Fig. 2. The combined unit comprising the net 14 and the container 1 is plunged into the water and is towed behind the fishing vessel in the normal manner used in trawl fishing. The fish caught in the net 14 are carried by the flow of water through openings 2, 5 and 6 and are thereby sluiced into the cavity of container 1. The fish will have a natural tendency to swim towards the light provided by the window 10 at the rear end of the container, where, owing to the fact that the relatively heavy currents of water flowing through the bag 4 will escape through the holes 11 in the side walls, the water will remain substantially at rest.

When the submarine acquarium shall be used for temporary storage of live fish, for example in a harbour, the rope 8 is detached and slackened whereby the rear end of the bag 4 is lowered into the position illustrated in Fig. 3. In this position the bag 4 will form a screen or curtain covering the opening 2 and will thus prevent the fish from escaping from the container 1.

In order to open the front end of the container the other rope 7 is likewise lowered and the front portion of the bag 4 is thereby lowered into the position shown in Fig. 4 where the opening 2 is uncovered so that the live fish may be removed from the interior of the container 1.

While the embodiment described and illustrated is believed to be preferable for practical use, it will be understood that the invention is not limited to the specific features shown in the drawings. In fact, various modifications both as regards the construction of the submarine aquarium and the means used for providing the trap device and turbulence preventing means may be varied in detail as will be obvious to anyone skilled in the art.

I claim:

1. A submarine container for collecting live fish comprising a hollow casing provided with an inlet aperture at one end thereof, a hollow member disposed within the cavity of said casing so as to communicate with the inlet aperture thereof, said hollow member having an outlet opening at the rear end thereof, the plane of said outlet opening being disposed substantially at right angles to the plane of the inlet aperture in the casing, and said casing having a plurality of holes in the side walls thereof, adjacent the outlet opening of said hollow member, the area defined by the said holes being substantially equal to the surface area of the outlet opening of said hollow member.

2. A submarine container as claimed in claim 1, in which the surface area of the outlet opening of said hollow member is substantially equal to the surface area of the inlet aperture of the casing.

3. A submarine container as claimed in claim 1, in which the total surface area of the holes provided in the side walls of the hollow casing is substantially equal to the surface area of the inlet aperture of said casing.

4. A submarine fish collecting device as claimed in claim 1 wherein said hollow member is constituted of a flexible material.

5. A submarine fish collecting device as claimed in claim 1 wherein said hollow member is constituted of a flexible material, and including means for adjustably positioning said hollow member within the casing.

6. A submarine fish collecting device comprising a hollow casing having an inlet aperture therein and a hollow member disposed within said casing near said inlet opening of said casing, said hollow member being constituted of a plurality of relatively movable peripheral walls, and means for supporting said hollow member in a plurality of different positions, whereby said peripheral walls are adapted to assume a plurality of different positions relative to each other.

7. A submarine fish collecting device as claimed in claim 6 wherein said hollow member comprises a top wall, two side walls, a rear wall and a bottom wall, and wherein in one of said plurality of positions said rear wall is positioned in a plane removed from and substantially parallel to said inlet aperture in said casing.

8. A submarine fish collecting device as claimed in claim 6 wherein said hollow member comprises a top wall, two side walls, a rear wall and a bottom wall, and wherein one of said plurality positions said rear wall is positioned in a plane removed from and substantially parallel to said inlet aperture in said casing, and wherein in another of said plurality of positions said hollow member is positioned completely beneath said inlet aperture in said hollow casing.

9. A submarine fish collecting device as claimed in claim 6 wherein said hollow member comprises a top wall, two side walls, a rear wall and a bottom wall, and wherein in one of said plurality positions said rear wall is positioned in a plane removed from and substantially parallel to said inlet aperture in said casing, and wherein in another of said plurality of positions, said hollow member is positioned with said top wall overlying the inlet aperture in said casing.

10. A submarine fish collecting device as claimed in claim 1 wherein said hollow member is suspended within said casing by a plurality of ropes passing through a wall of said casing, said ropes being secured to said hollow member at the front and rear end thereof so as to enable the trap device to be lowered toward the bottom of said casing by loosening said ropes.

11. A submarine fish collecting device as claimed in claim 1 including a translucent window in the wall of said casing.

12. A collecting device for live fish comprising a hollow casing having sidewalls and an inlet aperture at one end thereof, a trap device comprising a hollow member disposed within the cavity of said hollow casing adjacent the inlet aperture thereof, said hollow member having an inlet opening substantially coinciding with the inlet aperture of said casing and an outlet opening at the rear end thereof, and means comprising a series of apertures in the front portion of said side walls to maintain the body of water within the rear portion of said casing substantially without turbulence.

13. A submarine fish collecting device as claimed in claim 1, said casing having in the rear portion of a side wall thereof, an additional plurality of holes, few in number relative to those holes adjacent the outlet opening of said hollow member, whereby means is provided for slowly changing the water within the rear portion of said casing.

References Cited in the file of this patent
UNITED STATES PATENTS

| | | |
|---|---|---|
| 386,591 | Kile | July 24, 1888 |
| 446,755 | Johnson | Feb. 17, 1891 |
| 643,669 | Marty | Feb. 20, 1900 |
| 693,391 | Holland | Feb. 18, 1902 |
| 893,943 | Sellman | July 21, 1908 |
| 1,360,038 | Sichmeller | Nov. 23, 1920 |
| 1,476,230 | Thompson | Dec. 4, 1923 |